(12) United States Patent
Owens

(10) Patent No.: US 8,360,378 B1
(45) Date of Patent: Jan. 29, 2013

(54) MOBILE ELECTRONIC DEVICE SUPPORT

(76) Inventor: Michael D. Owens, Pawleys Island, SC (US)

( * ) Notice: Subject to any disclaimer, the term of this patent is extended or adjusted under 35 U.S.C. 154(b) by 228 days.

(21) Appl. No.: 12/592,823

(22) Filed: Dec. 3, 2009

Related U.S. Application Data

(60) Provisional application No. 61/212,061, filed on Apr. 7, 2009.

(51) Int. Cl.
 *A47G 1/17* (2006.01)
 *A47F 5/00* (2006.01)
 *A44B 1/04* (2006.01)

(52) U.S. Cl. ............ 248/309.4; 248/309.1; 24/303; 24/3.11

(58) Field of Classification Search ......... 248/309.1, 248/311.2, 314, 316.1, 316.7; 206/305, 320, 206/701; 220/483; 24/303, 3.9, 3.11, 3.12, 24/3.1, 649; 224/247
See application file for complete search history.

(56) References Cited

U.S. PATENT DOCUMENTS

| | | | |
|---|---|---|---|
| 2,423,978 A * | 7/1947 | Hunter | 160/178.1 R |
| 2,717,717 A * | 9/1955 | Busch | 220/483 |
| 3,665,490 A | 5/1972 | Oskar | |
| 5,203,601 A * | 4/1993 | Guillot | 296/77.1 |
| 5,529,271 A | 6/1996 | Dunchock | |
| 5,897,040 A | 4/1999 | Ward | |
| 6,149,116 A | 11/2000 | Won | |
| 6,888,940 B1 * | 5/2005 | Deppen | 379/446 |
| 7,040,590 B2 | 5/2006 | Carnevali | |
| 7,263,793 B1 * | 9/2007 | Van't Hof | 40/584 |
| 7,897,088 B2 * | 3/2011 | Mitchell | 264/275 |
| 2002/0060642 A1 * | 5/2002 | Togasaka | 342/357.09 |
| 2002/0113185 A1 | 8/2002 | Ziegler | |
| 2005/0284904 A1 | 12/2005 | Knapp et al. | |
| 2006/0016050 A1 * | 1/2006 | Yoshiguchi | 24/3.12 |
| 2006/0113340 A1 | 6/2006 | Goradesky | |
| 2006/0166720 A1 | 7/2006 | Dixon | |
| 2007/0175313 A1 | 8/2007 | Vandervliet | |
| 2009/0322114 A1 * | 12/2009 | Hardy et al. | 296/37.16 |

* cited by examiner

*Primary Examiner* — Jonathan Liu
*Assistant Examiner* — Erin W Smith
(74) *Attorney, Agent, or Firm* — P. Jeff Martin; The Law Firm of P. Jeffrey Martin, LLC

(57) ABSTRACT

A mobile electronic device support is disclosed for allowing a mobile electronic device to be removably secured to a surface, such as a column.

14 Claims, 3 Drawing Sheets

MOBILE ELECTRONIC DEVICE SUPPORT

RELATED APPLICATIONS

This application claims the benefit of U.S. Provisional Application No. 61/212,061 filed on Apr. 7, 2009.

BACKGROUND OF THE INVENTION

1. Field of the Invention

This application discloses and claims embodiments generally related to a holder for an electronic device, and more particularly, to a mobile electronic device support for holding an electronic device, the support being adapted to fixedly engage a magnetically attractive or magnetically conductive surface.

2. Description of the Related Art

The prior art discloses various holders for portable electronic devices, in addition to assorted means for securing such devices to objects such as a vehicle dashboard, hand-held microphone, motorcycle gas tank, bicycle, and a person's wrist.

However, the prior art has failed to disclose a holder for a mobile electronic device, the holder being adapted to be removably attached to a golf cart in a secure manner.

Accordingly, a long felt need has been realized for a device adapted for holding a mobile electronic device and which is further adapted for removable attachment to a golf cart. The development of the mobile electronic device support fulfills this need.

A search of the prior art did not disclose any patents that read directly on the claims of the instant invention; however, the following references were considered related.

U.S. Pat. No. 6,149,116, issued in the name of Won;
U.S. Pat. No. 6,888,940, issued in the name of Deppen;
U.S. Pat. No. 5,897,040, issued in the name of Ward;
U.S. Patent Application no. 2006/0166720 A1, published in the name of Dixon;
U.S. Patent Application no. 2002/0113185 A1, published in the name of Ziegler,
U.S. Pat. No. 7,040,590 B2, issued in the name of Camevali;
U.S. Patent Application no. 2007/0175313 A1, published in the name of Vandervliet,
U.S. Pat. No. 3,665,490, issued in the name of Oskar
U.S. Pat. No. 5,529,271, issued in the name of Dunchock;
U.S. Patent Application no. 2005/0284904 A1, published in the name of Knapp et al.; and
U.S. Patent Application no. 2006/0113340 A1, published in the name of Goradesky.

Consequently, a need has been felt for a device adapted for securely holding a mobile electronic device and which is further adapted for removable attachment to a golf cart. This application presents claims and embodiments that fulfill a need or needs not yet satisfied by the products, inventions and methods previously or presently available. In particular, the claims and embodiments disclosed herein describe a mobile electronic device support for allowing a mobile electronic device to be removably secured to a surface, such as a column, the support device comprising a housing defined of a continuous closed tubular walled body, the body having an electronic mobile device connector receiving aperture, and a magnetic attachment means, wherein the support device providing unanticipated and nonobvious combination of features distinguished from the products, inventions and methods preexisting in the art. The applicant is unaware of any product, method, disclosure or reference that discloses the features of the claims and embodiments disclosed herein.

SUMMARY OF THE INVENTION

Therefore, it is an object of the present invention to provide a device for holding a mobile electronic device, the device adapted for removable attachment to a surface.

It is another object of the present invention to provide a device which includes a hollow housing formed of a lightweight, rigid plastic material.

It is another object of the present invention to provide a housing having a means for removably securing a mobile electronic device thereto.

It is another object of the present invention to provide a bracket adapted for snugly engaging and shapely conforming to an external contour of a roof support column of a golf cart.

It is still another object of the present invention to provide a housing having a magnetic attachment means for fixedly engaging a magnetically attractive or magnetically conductive surface, such as the roof support column of a golf cart.

In accordance with one embodiment of the present invention, a mobile electronic device support is disclosed for allowing a mobile electronic device to be removably secured to a surface, such as a column. The mobile electronic device support, hereinafter device support, comprises an elongated, hollow housing having a square cross section and a substantially continuous closed tubular walled body. The body is preferably manufactured from a lightweight, rigid material such as plastic or thermoplastic. The body has an open upper end and an open lower end providing direct passage into an open interior cavity.

The body further comprises a top cap suitably affixed atop the open upper end thereof, and a bottom cap suitably affixed to the open lower end thereof.

An elongated connector receiving aperture is defined through a front wall of the body to facilitate connective attachment by a mobile electronic device thereto, thereby allowing the mobile electronic device to be removably attached to the body. Mobile electronic device is intended to include but is not limited to a golf Global Positioning System (GPS) device, a golf laser rangefinder, a cellular phone, a personal digital assistant (PDA) organizer, a portable radio, a pager, or other hand-held mobile electronic devices.

A U-shaped bracket is securely affixed to a rear wall of the body. The U-shaped bracket is adapted to snugly engage and shapely conform to an external contour of a surface, and more particularly, the roof support column of a golf cart.

An attachment means is disclosed, wherein the attachment means is securely affixed to the rear wall of the body, below the bracket. The attachment means is defined as being magnetic, thereby being attracted to any magnetically attractive or magnetically conductive surface, such as the steel roof support column of a golf cart. Thus, positioning of attachment means onto a magnetically attractive or magnetically conductive surface ensures fixed engagement by attachment means, and hence the mobile electronic device with the magnetically attractive or magnetically conductive surface.

An alternate embodiment is disclosed wherein the bracket may be defined as having an incurvate or concave shape which shapely conforms to the external contour of a roof support column having a circular cross section or the like.

The use of the present invention allows a mobile electronic device to be removably attached to the roof support column of a golf cart in a quick, easy, and efficient manner.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

Detailed Description of the Figures

Figure 1:
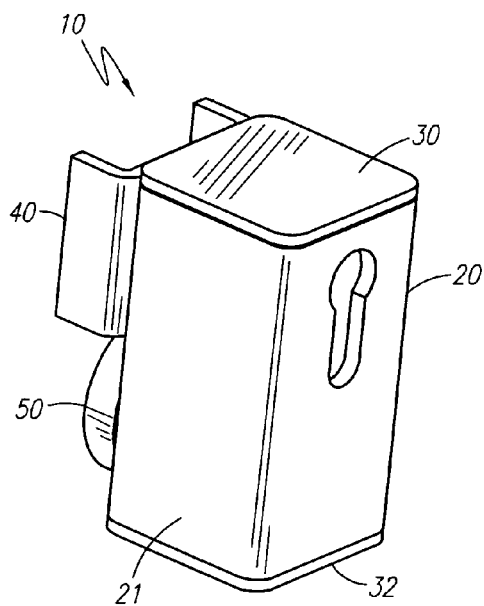
FIG. 1 is a perspective view of a mobile electronic device support, shown from front, above, and right end, according to the preferred embodiment of the present invention.
Figure 2:
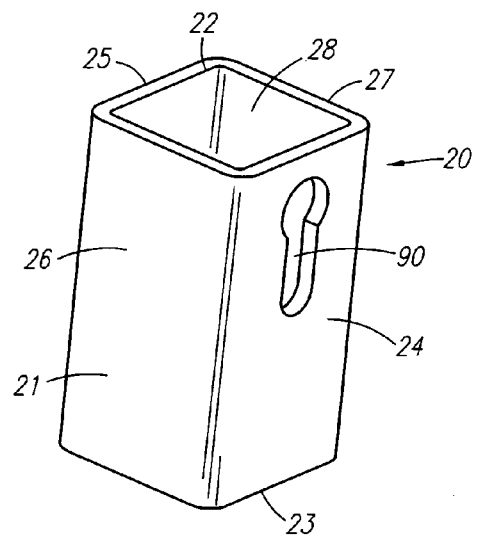
FIG. 2 is a perspective view of the housing of the present invention, shown from front, above, and right end according to the preferred embodiment thereof.
Figure 3:
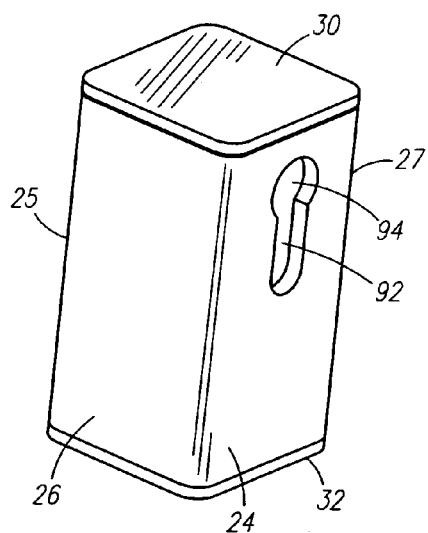
FIG. 3 is a perspective view of the housing shown with a top cap and a bottom cap affixed thereto, according to the preferred embodiment of the present invention.
Figure 4:
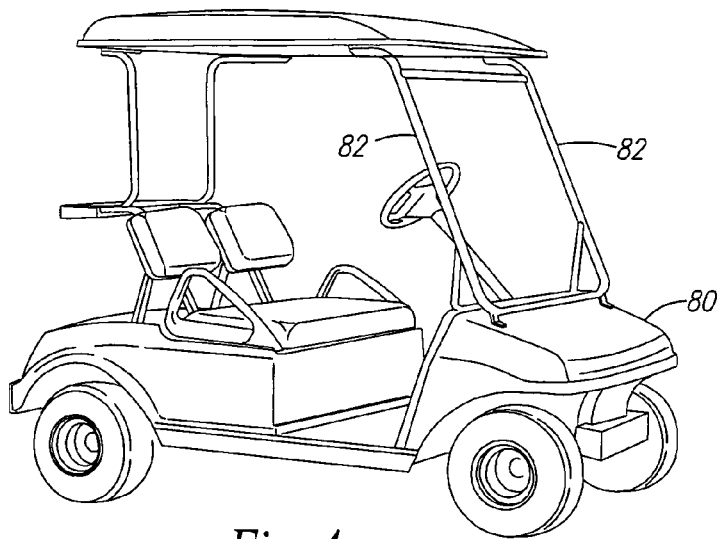
FIG. 4 is a perspective view of a golf cart.

With reference to FIGS. 1-3, a mobile electronic device support 10 is disclosed, according to one embodiment of the present invention, for securely holding a mobile electronic device 100 or other device, wherein the mobile electronic device support 10 is adapted for removable attachment to a magnetically attractive or magnetically conductive surface 70. The mobile electronic device support 10, hereinafter referred to as "support 10", comprises an elongated, hollow housing 20 having a square cross section and a substantially continuous closed tubular walled body 21. The body 21 is preferably manufactured from a lightweight, rigid material such as plastic or thermoplastic. The body 21 may be constructed utilizing a common molding process such as injection molding, blow molding, extrusion, or other molding and fabricating methods. Preferred plastic or thermoplastic materials include polyvinyl chloride (PVC), polypropylene, polyolefin, acrylonitrile-butadiene-styrene (ABS), polyethylene, polyurethane, polycarbonate, or blends thereof, and ABS/Nylon blend. Alternatively, the body 21 may be constructed of a lightweight, resilient material such as metal or a metallic-plastic composite.

The body 21 has an open upper end 22 and an open lower end 23 providing direct passage into an open interior cavity 28 formed within the closed tubular walled body 21. The body 21 includes a front wall 24 and a rear wall 25, wherein front wall 24 and rear wall 25 are integrally joined substantially perpendicular by a pair of lateral side walls 26 and 27.

The body 21 further comprises a top cap 30 suitably affixed atop the open upper end 22 thereof, and a bottom cap 32 suitably affixed to the open lower end 23 thereof. The top cap 30 and bottom cap 32 each having a square cross section and being substantially sized and configured so as to define an area (length×width) being consistent with the area of body 21. The top cap 30 and bottom cap 32 are manufactured from a material consistent with the material selected for constructing body 21.

Figure 5A:
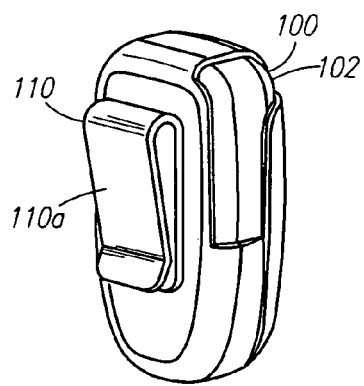
FIGS. 5A-5D illustrate various connector elements of mobile electronic devices.
Figure 5B:
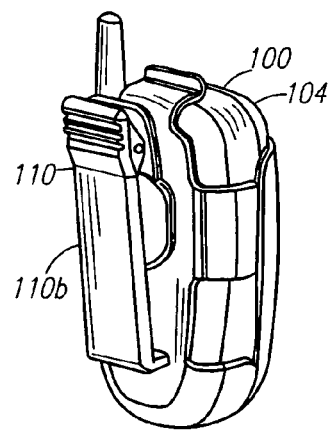
Figure 5C:
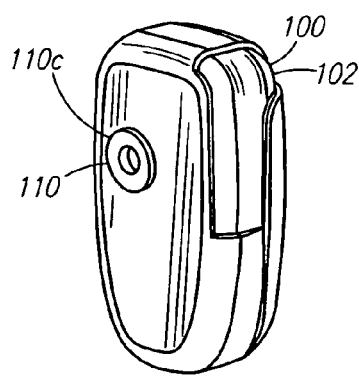
Figure 5D:
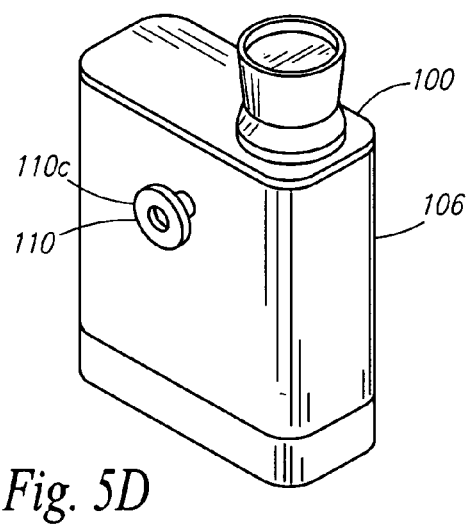
Figure 6:
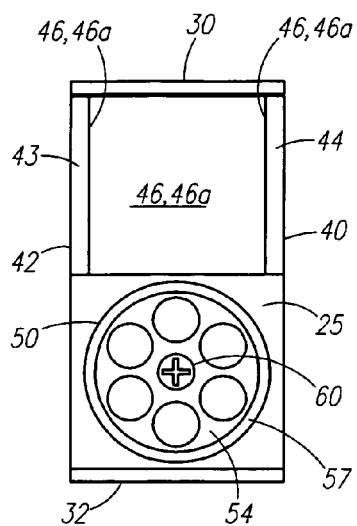
FIG. 6 is a bottom plan view of the body of the present invention illustrating the bracket and attachment means, according to the preferred embodiment.
Figure 7:
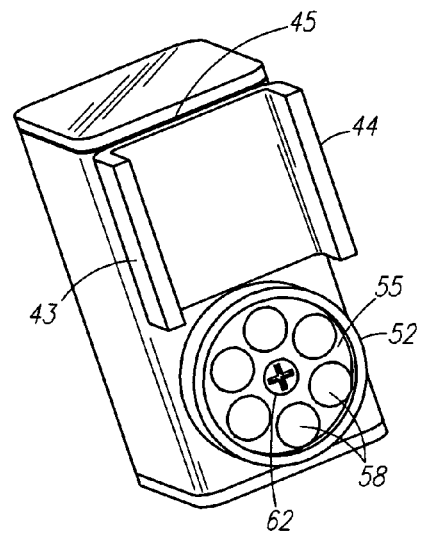
FIG. 7 is a perspective view of the mobile electronic device support, shown from rear, above, and left end, illustrating the bracket and attachment means, according to the preferred embodiment of the present invention.
Figure 8:
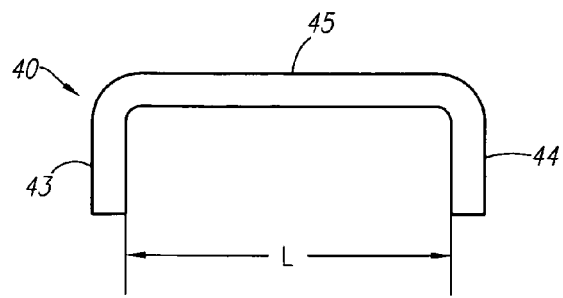
FIG. 8 is an end view of the bracket, according to the preferred embodiment of the present invention.

Referring now more specifically to FIGS. 1-3, 5A-5D, and 10, an elongated connector receiving aperture 90 is defined through the front wall 24 of the body 21 to facilitate connective attachment by a mobile electronic device 100 thereto, thereby facilitating removable attachment of mobile electronic device 100 to the body 21. Mobile electronic device 100 is intended to include but is not limited to a golf Global Positioning System (GPS) device 102, cellular phone 104, a golf laser rangefinder 106, a personal digital assistant (PDA) organizer, a portable radio, a pager, or other hand-held mobile electronic devices. The elongated connector receiving aperture 90 is more specifically defined as a linearly elongated opening 92 which extends upward into an enlarged circular void 94. Aperture 90 is sized, shaped, and configured to receive the article or belt connector element 110 of a mobile electronic device 100. The connector element 110 of a mobile electronic device 100 is typically located on the rear side of the housing of a mobile electronic device 100 and allows for connection by device 100 to a belt or other article. Common connector elements 110 are illustrated in FIGS. 5A-5D, wherein FIG. 5A illustrates a conventional belt clip mechanism 110a mounted to a golf GPS device 102, FIG. 5B illustrates a modified belt clip mechanism 110b mounted to a cellular phone 104, FIG. 5C illustrates a connector button 110c mounted to a golf GPS device 102, and FIG. 5D illustrates a connector button 110c mounted to a golf laser rangefinder 106.

In order to facilitate removable connective attachment by a mobile electronic device 100, such as a golf GPS device 102, to the body 21 of the elongated, hollow housing 20, a lower end or edge of the connector element 110 of mobile electronic device 100 is inserted through the elongated connector receiving aperture 90 and into the open interior cavity 28 of body 21. The connector element 110 frictionally engages an inner surface of the front wall 24 of body 21 and is held securely thereagainst via mechanical interference or frictional impingement, thereby removably attaching mobile electronic device 100 to the body 21.

Figure 9:
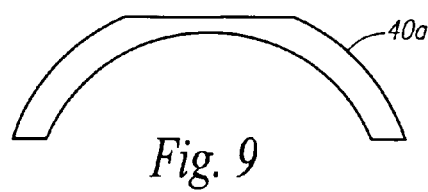
FIG. 9 is an end view of a bracket, according to an alternate embodiment of the present invention.

Referring now to FIGS. 1, 4, and 6-10, a U-shaped bracket 40 is disclosed, wherein bracket 40 is securely affixed to the rear wall 25 of body 21 via a suitable adhesive or other suitable means for affixing bracket 40 to the rear wall 25 of body 21. The bracket 40 comprises a base 42 having opposed outer ends 43, 44 upwardly depending therefrom. The base 42 includes an outer surface 45 and an inner surface 46, the inner surface 46 defined more specifically as a support column engaging surface 46a for snugly engaging and shapely conforming to an external contour of a roof support column 82 of a golf cart 80. The support column engaging surface 46a defines a surface area suitably dimensioned for engaging and shapely conforming to the roof support column 82 in a snug-fit manner. It is therefore within the scope of the present invention that a length L of the bracket 40 may be increased or decreased independently or in different combinations so as to accommodate various sized roof support columns 82 of golf carts 80. Further, the opposed outer ends 43, 44 as well as the base 42 of the bracket 40 may each define an incurvate or concave shape which shapely conforms to the external contour of a roof support column 82 having a circular cross section or the like. A bracket 40a having a concave shape is illustrated in FIG. 9.

An attachment means 50 is disclosed, wherein attachment means 50 is securely affixed to the rear wall 25 of body 21, below bracket 40, via a fastener 60, such as a screw 62, or other suitable means for affixing attachment means 50 to the rear wall 25 of body 21. The attachment means 50 is defined as being magnetic, thereby being attracted to any magnetically attractive or magnetically conductive surface 70, such as the steel roof support column 82 of a golf cart 80. The attachment means 50 comprises a cup-shaped container 52 having a bottom 54 with an upper surface 55 and a lower surface 56, wherein bottom 54 includes an upstanding wall 57 forming a perimeter therearound.

The attachment means 50 further comprises a plurality of magnets 58 mounted annularly atop the upper surface 55 of the bottom 54. The plurality of magnets 58 are defined as being disc-shaped and provide a magnetic pull force of approximately fifty (50) pounds. Thus, positioning of attachment means 50 onto a magnetically attractive or magnetically conductive surface 70 ensures fixed engagement by attachment means 50, and hence mobile electronic device 100, with the magnetically attractive or magnetically conductive surface 70. The magnetic pull force provided by the plurality of magnets 58 ensures mobile electronic device 100 remains in a fixedly secured, stationary position against the roof support column 82 as golf cart 80 negotiates travel along a golf course or other off road areas.

The plurality of magnets 58 may comprise a wide variety of permanent magnets including rare earth magnets, alnico magnets, ceramic magnets, and flexible magnets. Other suitable magnets for use as described hereinabove may include rare earth magnets such as Samarium Cobalt and neodymium iron classes.

Ceramic or Ferrite magnets are made of a composite of iron oxide and barium or strontium carbonate. These materials are readily available and at a lower cost than other types of materials used in permanent magnets making it desirable due to the lower cost. Ceramic magnets are produced using pressing and sintering, but are brittle and require diamond wheels if grinding is necessary. These magnets are made in different grades. Ceramic grade 1 is an isotropic grade having equal magnetic properties in all directions. Ceramic grades 5 and 8 are anisotropic grades. Anisotropic magnets are magnetized in the direction of pressing. The anisotropic method delivers the highest energy product among ceramic magnets at values up to 3.5 MGOe (Mega Gauss Oersted). Ceramic magnets possess a good balance of magnetic strength, resistance to demagnetization and low cost.

Flexible magnets are magnets made of flexible materials that are bonded with a magnetic material. Flexible magnets are advantageous in that they may be bent, coiled, twisted, or otherwise machined into almost any desired shape without depleting their magnetic field. Flexible magnets are corrosion resistant, do not need a coating, are easily machined, and may be bonded with a high magnetic energy material.

Rare earth metal magnets are composed of more expensive magnetic material. Rare earth magnets may be coated onto a flexible material, e.g., plastic or nylon, and will provide excellent magnetic strength and flexibility. These magnets can also be manufactured so as to be very thin.

Alnico magnets are made primarily from a composite of aluminum, nickel, and cobalt with small amounts of other elements added to enhance the properties of the magnet. Alnico magnets possess excellent temperature stability, good resistance to demagnetization due to shock, but are easily demagnetized. Alnico magnets are produced by two typical methods, namely, casting or sintering. Sintering offers superior mechanical characteristics, whereas casting delivers higher energy products (up to 5.5 MGOe) and allows for the design of intricate shapes. Alnico magnets are made in different grades. Grades 5 and 8, which are anisotropic grades, are two very common grades. Anisotropic grades provide for a preferred direction of magnetic orientation. Alnico magnets have been replaced in many applications by ceramic and rare earth magnets.

Figure 10:
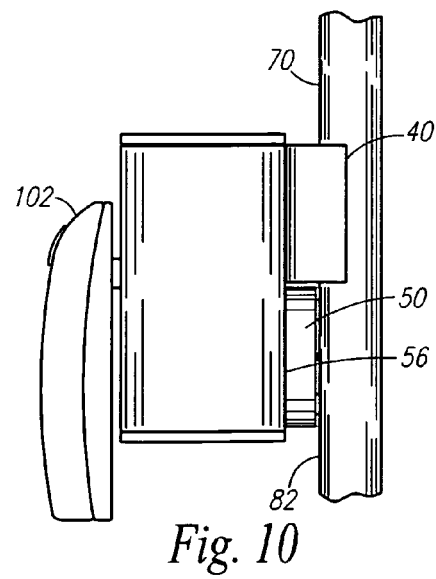
FIG. 10 is left side elevational view of the present invention shown in-use, according to the preferred embodiment thereof.

Finally, as illustrated in FIG. 10 and in accordance to the preferred embodiment, a golf GPS device 102 is shown removably attached to a roof support column 82 of a golf cart 80 in a secured, stationary manner.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A mobile electronic device support, the support comprising:
   An elongated, hollow housing, the housing having a square cross section and a substantially continuous closed tubular walled body;
   An elongated connector receiving aperture, the connector receiving aperture is defined through the body;
   A U-shaped bracket, the bracket is securely affixed to the body via a suitable securing element; and
   An attachment means, the attachment means is securely affixed via a fastener to the body below the bracket;
   Wherein the attachment means is securely affixed to the rear wall of the body below the bracket;
   Wherein the attachment means is recessed and wherein magnetics are affixed inside the recess, thereby being attracted to any magnetically attractive or magnetically conductive surface.

2. The mobile electronic device support of claim 1, wherein the body has an open upper end and an open lower end providing direct passage into an open interior cavity formed within the body, wherein the body includes a front wall and a rear wall, the front wall and the rear wall are integrally joined substantially perpendicular by a pair of lateral side walls.

3. The mobile electronic device support of claim 1, wherein the connector receiving aperture is defined through the front wall of the body, the connector receiving aperture is shaped and configured to facilitate connective attachment by a mobile electronic device thereto, thereby facilitating removable attachment of the mobile electronic device to the body.

4. The mobile electronic device support of claim 3, wherein the connector receiving aperture is defined as a linearly elongated opening which extends upward into an enlarged circular void, the connector receiving aperture is sized, shaped, and configured to receive an article connector element or a belt connector element of a mobile electronic device, the connector element frictionally engages an inner surface of the front wall of the body and is held securely thereagainst via mechanical interference or frictional impingement, thereby removably attaching the mobile electronic device to the body.

5. The mobile electronic device support of claim 1, wherein the bracket is securely affixed to the rear wall of the body, the bracket comprises a base having opposed outer ends upwardly depending therefrom, the base includes an outer surface and an inner surface, the inner surface is defined as a support column engaging surface for snugly engaging and shapely conforming to an external contour of a roof support column of a golf cart, the support column engaging surface defines a surface area suitably dimensioned for engaging and shapely conforming to the roof support column in a snug-fit manner.

6. The mobile electronic device support of claim 1, wherein the attachment means comprises a cup-shaped container having a bottom with an upper surface and a lower surface, wherein the bottom includes an upstanding wall forming a perimeter therearound.

7. The mobile electronic device support of claim 6, wherein the attachment means further comprises a plurality of magnets mounted annularly atop the upper surface of the bottom.

8. The mobile electronic device support of claim 7, wherein the plurality of magnets are defined as being disc-shaped.

9. The mobile electronic device support of claim 8, wherein the plurality of magnets provide a magnetic pull force of approximately fifty pounds, whereupon positioning of the attachment means onto a magnetically attractive or magnetically conductive surface ensures fixed engagement by the attachment means, and hence a mobile electronic device, with the magnetically attractive or magnetically conductive surface.

10. The mobile electronic device support of claim 9, wherein the magnetically attractive or magnetically conductive surface is a roof support column of a golf cart.

11. The mobile electronic device support of claim 9, wherein the mobile electronic device is a golf GPS device.

12. The mobile electronic device support of claim 2, wherein the body further comprises a top cap suitably affixed atop the open upper end thereof, and a bottom cap suitably affixed to the open lower end thereof.

13. The mobile electronic device support of claim 12, wherein the body is manufactured from a lightweight, rigid material.

14. The mobile electronic device support of claim 1, wherein the suitable securing element comprises an adhesive.

* * * * *